United States Patent [19]

Nishimura

[11] Patent Number: 5,572,419

[45] Date of Patent: Nov. 5, 1996

[54] CONTROL SYSTEM HAVING MULTIPLE CONTROL APPARATUSES

[75] Inventor: Makoto Nishimura, Aichi, Japan

[73] Assignee: Mitsubishi Denki Kabushiki Kaisha, Tokyo, Japan

[21] Appl. No.: 183,806

[22] Filed: Jan. 21, 1994

[30] Foreign Application Priority Data

Jan. 21, 1993 [JP] Japan ................................... 5-008322

[51] Int. Cl.$^6$ ................................................. G05B 15/00
[52] U.S. Cl. ........................................ 364/131; 318/625
[58] Field of Search ..................................... 364/131, 132, 364/474.11; 318/568.2, 593, 595, 625, 569

[56] References Cited

U.S. PATENT DOCUMENTS

| 4,503,507 | 3/1985 | Takeda et al. ................. 318/568.2 |
| 4,549,276 | 10/1985 | Inaba et al. .................. 318/568.2 |
| 4,629,956 | 12/1986 | Nozawa et al. ................... 318/625 |
| 4,631,684 | 12/1986 | Akasofu et al. .................. 364/131 |
| 4,879,644 | 11/1989 | Gottshall ...................... 364/474.11 |
| 4,882,669 | 11/1989 | Miura et al. ..................... 364/131 |
| 5,003,485 | 3/1991 | Francisco ......................... 364/132 |
| 5,005,134 | 4/1991 | Nakashima et al. ............. 364/474.11 |
| 5,032,975 | 7/1991 | Yamamoto et al. ............. 364/474.11 |
| 5,047,702 | 9/1991 | Hanaki et al. .................. 364/474.11 |
| 5,057,755 | 10/1991 | Naka ............................. 364/474.11 |
| 5,072,374 | 12/1991 | Sexton et al. ..................... 364/131 |
| 5,084,660 | 1/1992 | Sasaki et al. ..................... 318/569 |
| 5,146,410 | 9/1992 | Kawamura et al. ............. 364/474.11 |
| 5,184,052 | 2/1993 | Ikeda ............................ 364/474.11 |
| 5,184,053 | 2/1993 | Mawo et al. .................... 364/474.11 |
| 5,225,989 | 7/1993 | Kawamura et al. ............. 364/474.11 |
| 5,280,423 | 1/1994 | Imai et al. ........................ 364/132 |

FOREIGN PATENT DOCUMENTS

| 446733 | 9/1991 | European Pat. Off. . |
| 3806966 | 9/1988 | Germany . |
| 2140811 | 5/1990 | Japan ........................... G05B 19/19 |
| 2244355 | 11/1991 | United Kingdom . |

Primary Examiner—James P. Trammell
Attorney, Agent, or Firm—Sughrue, Mion, Zinn, Macpeak & Seas

[57] ABSTRACT

A control system having multiple control apparatuses connected by a data transmission path. Each of the control apparatuses comprises a communication control section, sequence control section, and positioning control section. The positioning control section of each control apparatus has a memory. A position controlling program is stored in the memory of a first one of the control apparatuses. The position controlling program has codes, each of which to be used by a positioning control sections of a particular control apparatus, for controlling its respective servo motor. The codes of the position controlling program are transmitted from the first control apparatus to another control apparatuses to cause the positioning control section of that apparatus to control its respective servo motor in accordance with the codes.

11 Claims, 11 Drawing Sheets

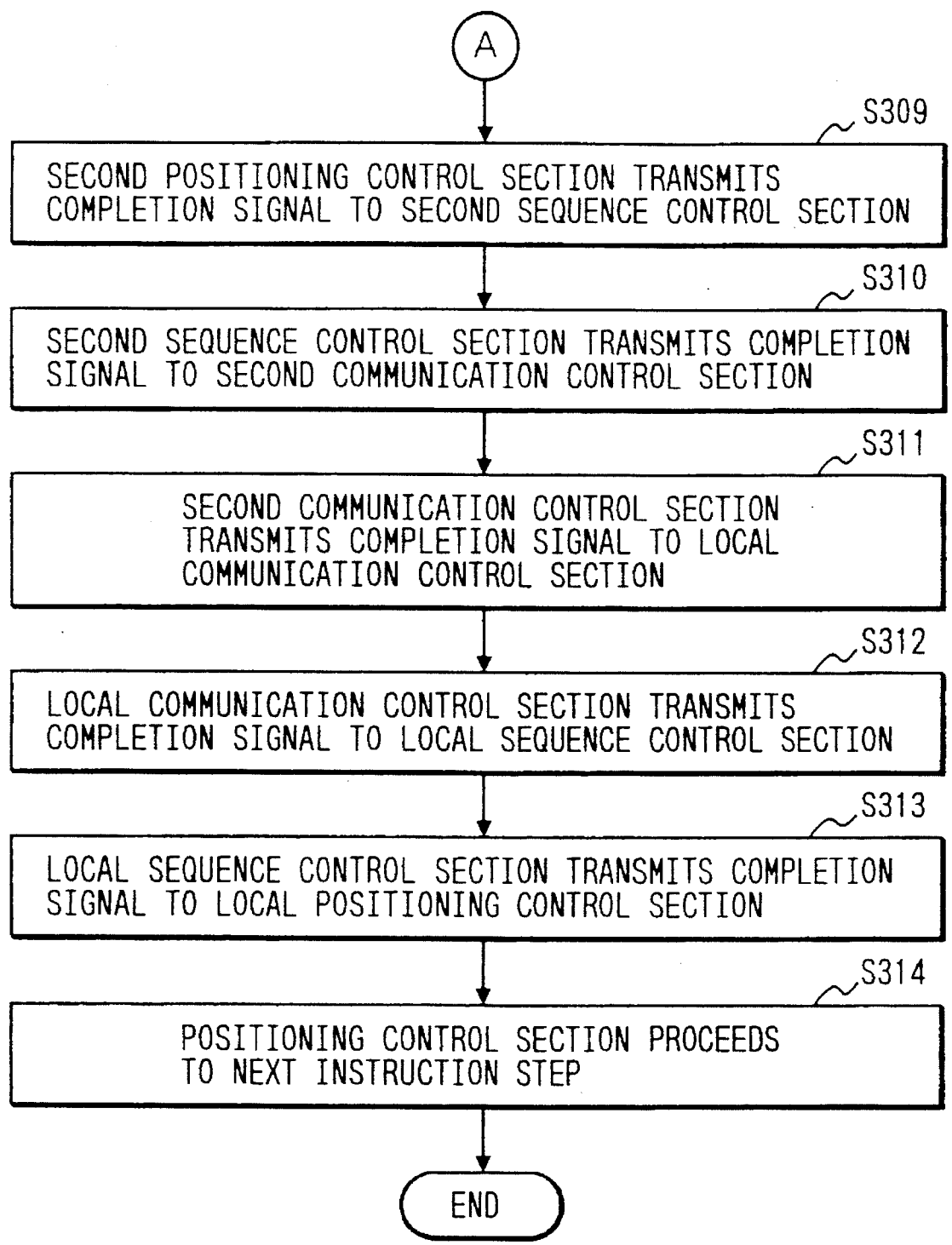

| COMPLETION SIGNAL | ~401 |

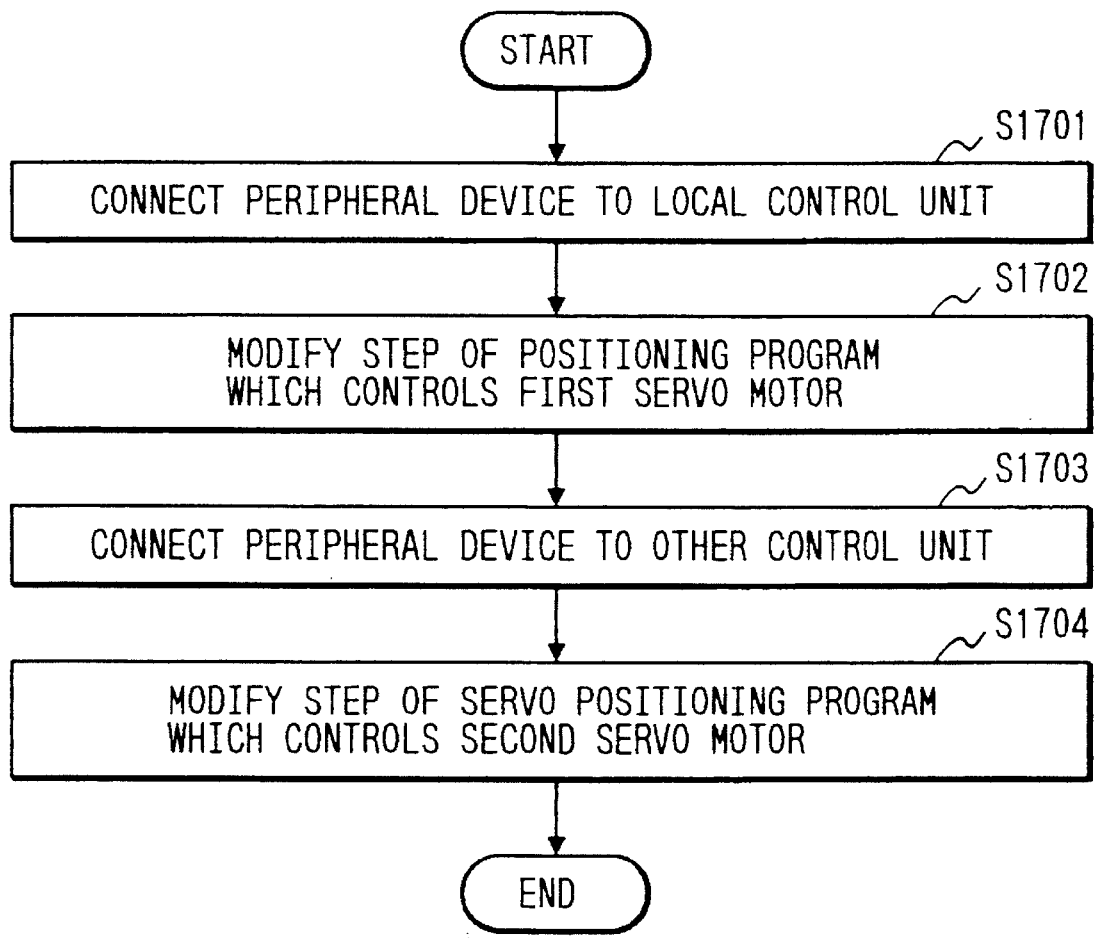

CONTROL SYSTEM HAVING MULTIPLE CONTROL APPARATUSES

BACKGROUND OF THE INVENTION

1. Field of the Invention

The present invention relates to a control system having a plurality of programmable controllers for performing positioning or speed control.

2. Description of the Related Art

FIG. 8 is a block diagram showing a conventional control system. Control apparatus 507 includes a communication control section 506 which receives an signal transmitted through the transmission path 515 and converts the received signal into a signal to be used by the sequence control section 501. The sequence control section 501 has an internal memory (not shown) having a sequence program stored therein. Under control of this sequence program, the sequence control section 501 periodically monitors the received signal and performs predetermined processing in response to the received signal to perform operations such as, for example, outputting a predetermined output signal. The communication control section 506 also receives control information output by the sequence control section 501, converts that information into a signal transmittable by the transmission path 515, and transmits the signal to the transmission path 515.

A positioning control section 502 is activated by a command from the sequence control section 501. Memory 503 is provided in the positioning control section 502 which stores a positioning program 504. A first motor 505, such as, for example, a servo motor, can be attached to an axis of an apparatus such as, for example, a solenoid valve. The first motor 505 can be driven by the positioning control section 502 as controlled by the positioning program 504. That is, the positioning control section 502 drives the servo motor 505 to perform predetermined positioning control and, for example, adjust the axis of the apparatus to align the apparatus at a predetermined position.

Control apparatus 514 comprises a communication control section 513, which is coupled to the communication control section 506 by transmissions path 515. In a manner similar to the communication control section 506, the communication control section 513 converts a signal transmitted through the transmission path 515 into control information signals, and inputs those signals to the sequence control section 508. The sequence control section 508 also has a memory (not shown) for storing a sequence program. Also, the communication control section 513 converts control information output from the sequence control section 508 into a signal transmittable by the transmission path 515, and transmits that signal to the transmission path 515.

Similar to the operation in the control apparatus 507, a positioning control section 509 is activated by a command from the sequence control section 508. Memory 510 is provided in the positioning control section 509 for storing a positioning program 511. A second motor 512, for example, a servo motor, can be driven by the positioning control section 509 as controlled in accordance with the positioning program 511. That is, the positioning control section 509 drives the servo motor 512 to carry out predetermined positioning control which, for example, controls solenoid valves, relays, etc. (not shown) in a predetermined sequence.

The operation of the conventional control system, as described generally above, will now be described in more detail.

The positioning control of the servo motor 505 is performed by the execution of the positioning program 504 having an instruction step filled with a code identifying the servo motor 505, and indicating a moving method, a positioning target position and a positioning travel speed for that servo motor 505. The positioning target position is hereinafter referred to as the address and the positioning travel speed as the speed.

The memory 510 stores positioning programs, such as positioning program 511, which control driving of the servo motor 512 by the positioning control section 509, to perform positioning control. The positioning program 504 has an instruction step for starting execution of any of the positioning programs stored in memory 510. Hence, the execution of the positioning program 504, having such an instruction step, causes any of the positioning programs stored in memory 510 to be executed to drive servo motor 512 to exercise positioning control.

That is, when the positioning program 504 is run to execute the instruction step for starting execution of the predetermined positioning program stored in the memory 510, predetermined control information is transmitted from the positioning control section 502 to the sequence control section 501. In accordance with this control information, the sequence control section 501 generates control information having a predetermined positioning program number. Note that each of the positioning programs stored in the memory 510 has an assigned positioning program number and thus, a positioning program to be executed is identified by this number.

The control information generated by the sequence control section 501 is transferred from the sequence control section 501 to the communication control section 506 and converted into transmittable data by the communication control section. The converted control information is then transmitted through the transmission path 515, and is received by the communication control section 513. The sequence control section 508 receives the control information from the communication control section 513, and provides this control information to the positioning control section 509. The positioning control section 509 then begins executing the positioning program corresponding to the positioning program number designated by the control information. Accordingly, the movement of the servo motor 512 is controlled in accordance with this positioning program.

Upon completion of the positioning control program, control information indicating this completion is transferred from the positioning control section 509 to the sequence control section 508, and to the communication control section 513. This control information is transmitted via transmission path 515 to the communication control section 506, which provides this control information to the sequence control section 501. The sequence control section 501 in turn provides the control information to the positioning control section 502. In accordance with this control information, the positioning program 504 progresses from the instruction step for starting execution of the positioning program stored in memory 510 (e.g., positioning program 511) which was currently being run to a next instruction step.

The above detailed operation the conventional control system will now be described in accordance with FIGS. 9–16.

FIG. 9 shows the transfer paths of the control information. FIG. 10 shows part of the program list of an example of the positioning program 504 which is stored in the memory 503.

This part of the positioning program 504 includes an instruction step 601 for driving the servo motor 505 to carry out positioning control, and an instruction step 602 for starting execution of a positioning program (e.g., positioning program 511) stored in memory 510 which controls driving of the servo motor 512.

As shown in FIG. 10, instruction step 601 is written as follows:

G01X ␣ F ␣ and instruction step 602 is written as follows:

M50.

In the instruction step 601, the first three digits represent a code which indicates a moving method. In the example shown in FIG. 10, this code is G01, indicating linear interpolation. The fourth digit represents a code which indicates a servo motor. Code X in this case indicates the servo motor 505. A space subsequent to X is filled with an address. F indicates that a space following F is filled with data representing the speed at which the servo motor is controlled to move.

In instruction step 602, M in the first digit indicates that this instruction is a miscellaneous function instruction. A code written subsequent to M is referred to as the M code which causes a variety of predetermined operations to be performed. In this example, the M code is "50". M code "50" is an instruction for starting the predetermined positioning program which is designed to drive the servo motor 512 to carry out positioning control. As described above, the positioning program for driving the servo motor 512 to exercise positioning control is stored in the memory 510 of the control apparatus 514.

FIG. 11 illustrates a flowchart of the operation of the conventional apparatus. When it is necessary, for example, for the sequence control section 501 to drive the servo motor 505 to exercise positioning control, the sequence control section 501 commands the control section 502 to begin executing the positioning program 504 which is stored in memory 503 as indicated in step S1101. In step S1102, when the positioning control section 502 executes instruction step 601, as shown in FIG. 10, of the positioning program 504, the positioning control section 502 performs feedback control and drives servo motor 505 to position a corresponding axis to a predetermined address at predetermined speed, thereby performing a linear interpolation operation.

In step S1103, the instruction step 602, as shown in FIG. 10, is then executed by the positioning control section 502, which transmits the M code "50" and a synchronization signal, as shown in FIG. 12, to the sequence control section 501 as indicated by control information transfer path "a" in FIG. 9. This synchronization signal is a signal which is output by the positioning control section 502 to the sequence control section 501 to inform the sequence control section 501 of the timing at which the M code output by the positioning control section 502 can be read (hereafter, the synchronization signal shall mean a signal output by a transmission device to a receiving device to inform the receiving device of the timing at which the information output by the transmission device can be read).

Upon reading the M code 801, as in step S1104, the sequence control section 501 determines if the M code is "50" in step S1105. If the M code is not "50", the sequence control section 501 executes other processing as specified by the M code 801. When the M code 801 is 50 as in this case, in step S1106, the sequence control section 501 outputs predetermined control information, as shown in FIG. 13 (the program number 901 and the synchronization signal 902), to the communication control section 506 as indicated by control information transfer path "b" in FIG. 9. The program number 901 is the number assigned to the positioning program stored in the memory 510 of the positioning control section 509 as described previously.

In step S1107, the communication control section 506 converts the control information transmitted by the sequence control section 501 into a signal transmittable in the transmission path 515 and transmits the signal to the communication control section 513 via the transmission path 515 as shown by control information transfer path "c" in FIG. 9. In step S1108, the communication control section 513 receives the signal transmitted from the communication control section 506, converts this received signal into control information transmittable to the sequence control section 508, and outputs the information to the sequence control section 508 as shown by control information data transfer path "d". In accordance with this control information, in step S1109, the sequence control section 508 commands the positioning control section 509 to start the positioning program having the program number 901 stored in the memory 510 of the positioning control section 509 as indicated by control information transfer path "e".

FIG. 14 shows the program list of the positioning program indicated by the program number 901. This positioning program is stored in the memory 510. This program list includes an instruction step 1001 for driving the servo motor 512 to perform positioning control, and an instruction code 1002 indicating the end of program number 901. The instruction step 1001 is written as follows:

G01X ␣ F ␣ and instruction step 1002 is written as follows:

M2.

In the instruction step 1001, G01 represents linear interpolation. X here represents the servo motor 512, indicating that the axis is positioned to move to the address indicated by a value corresponding to data in a space subsequent to X at the speed indicated by a value corresponding to data in a space subsequent to F.

As shown in step S1110 of FIG. 15, the positioning control section 509 executes the positioning program of the program number 901, and exercises feedback control on velocity and positioning of the servo motor to drive the servo motor 512 to exercise positioning control. Upon executing the instruction 1002 of program 901, as shown in step S1111, the positioning control section 509 terminates the execution of the selected positioning program. The miscellaneous function instruction of the M code "2" in instruction 1002 is an instruction which terminates the execution of the program.

When the positioning is then complete, in step S1112, a completion signal 1101, as shown in FIG. 16, is transmitted from the positioning control section 509 to the sequence control section 508 as indicated by control information transfer path "f" in FIG. 9. When the completion signal 1101 is sent by the positioning control section 509 to the sequence control section 508, in step S1113, the sequence control section 508 further transmits the completion signal 1101 to the communication control section 513 as indicated by control information transfer path "g".

In step S1114, the communication control section 513 further transmits the completion signal 1101 to the communication control section 506 in the control apparatus 507 via the transmission path 515 as shown by control information transfer path "h". After the completion signal 1101 is received by the communication control section 506, in step S1115, the communication control section 506 further sends the completion signal 1101 to the sequence control section 501 as indicated by control information transfer path "i".

In step S1116, the sequence control section 501 further transmits the completion signal 1101 to the positioning control section 502 as indicated by control information transfer path "j". When the completion signal 1101 is provided to the positioning control section 502 by the sequence control section 501, the positioning control section 502 ends the execution of the instruction step 602 and advances to a next instruction step as indicated by step S1117.

As described above, the servo motor 512 is driven under the command of the positioning control section 502 in the control apparatus 507 to exercise positioning control in accordance with a positioning program stored in memory 510.

In a typical system having axes which are controlled by servo motors, the number of axes in the system is generally equal to the number of servo motors. Often it is necessary to add more control axes in a system. Therefore, additional servo motors and additional control apparatuses for controlling these servo motors are required. When it is necessary to add additional control apparatus for driving additional servo motors to perform further positioning control of the system effected by the additional axes, positioning programs having predetermined program numbers are similarly stored in the memory of each of those additional control apparatus. When the positioning control section 502 executes a positioning program having an instruction for starting-any of the positioning programs, the corresponding servo motor is driven by its corresponding control apparatus to perform positioning control.

In the conventional positioning system configured as described above, a program step for controlling the servo motor 512 must be present in the positioning program 504 of the positioning control section 502 in the control apparatus 507, and is also required to be included in the positioning program 511 of the positioning control section 509 in the control apparatus 514. Therefore, if the positioning of the servo motors 505 and 512 needs to be altered, and a peripheral device (not shown) is used to alter the positioning programs, the peripheral device must be connected to each control apparatus 507 and 514. The peripheral device is used, for example, for debugging, monitoring, etc. of the programs in the control apparatuses.

For example, as shown in the flowchart in FIG. 17, in step S1701, the peripheral device is connected to the control apparatus 507. In step S1702, instruction 601 (see FIG. 10) of the positioning program 504 is corrected by the peripheral device. Then, in step S1703, the peripheral device is connected to control apparatus 514 and positioning program 511 is corrected in step S1704. Hence, at least four steps are required to correct positioning programs in two apparatuses.

Also, since program numbers must be assigned to the positioning programs and positioning is carried out by specifying this program number, the programs are complicated and difficult to understand, requiring much time to write and correct them.

SUMMARY OF THE INVENTION

Accordingly, an object of the present invention is to overcome the above disadvantages by providing a control system which allows a single control apparatus to store a positioning program for instructing multiple control apparatuses to control their respective servo motors. Another object of the invention is to provide a control system wherein program instructions for controlling servo motors can be modified and written easily with a peripheral device. Such programs are simplified and easy to understand.

To achieve this object, the present invention provides a control system having multiple control apparatuses connected by a data transmission path. Each of the control apparatuses comprises a communication control section, sequence control section, and positioning control section. The positioning control section of each control apparatus has a memory. A position controlling program is stored in the memory of one of the control apparatuses. The position controlling program has codes, each of which is to be used by a positioning control section of a particular control apparatus, for controlling its respective servo motor.

When the positioning controlling section of the first control apparatus is controlled by the sequence control section of that first control apparatus to begin executing the positioning controlling program stored in its memory, the position controlling section controls the first servo motor as specified in the controlling program, and also transfers codes in that program to the sequence control section. A memory in the sequence control section stores these codes. The sequence control section then transfers these codes via the communication control section and the data transmission path to another control apparatus.

This second control apparatus receives the codes and stores them in a memory in its positioning controlling section. The position controlling section of this second control apparatus controls its respective servo motor in accordance with these stored codes. When control of the servo motor is completed, the second control apparatus provides a completion signal to the first control apparatus and the position controlling section begins executing another step of the position controlling program.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which:

FIG. 5 is a flowchart showing further operation of an embodiment of the positioning system of the present invention;

FIG. 16 illustrates control information in the conventional positioning system; and FIG. 17 illustrates the steps for using a peripheral device to change the positioning programs in the conventional control apparatus.

DETAILED DESCRIPTION OF THE PREFERRED EMBODIMENTS

Figure 1:
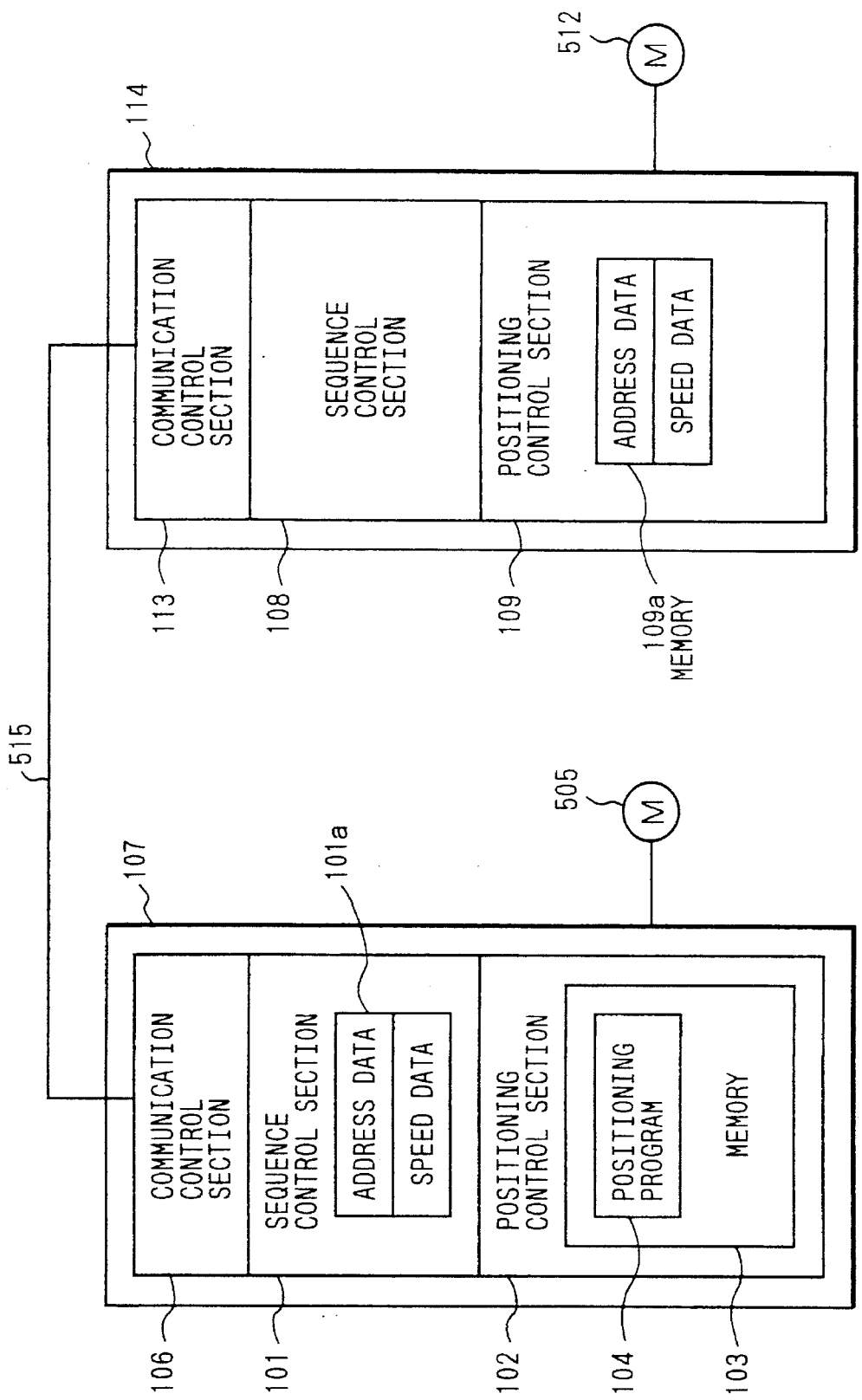
FIG. 1 is a block configuration diagram of a positioning system illustrating a preferred embodiment of the present invention.
Figure 8:
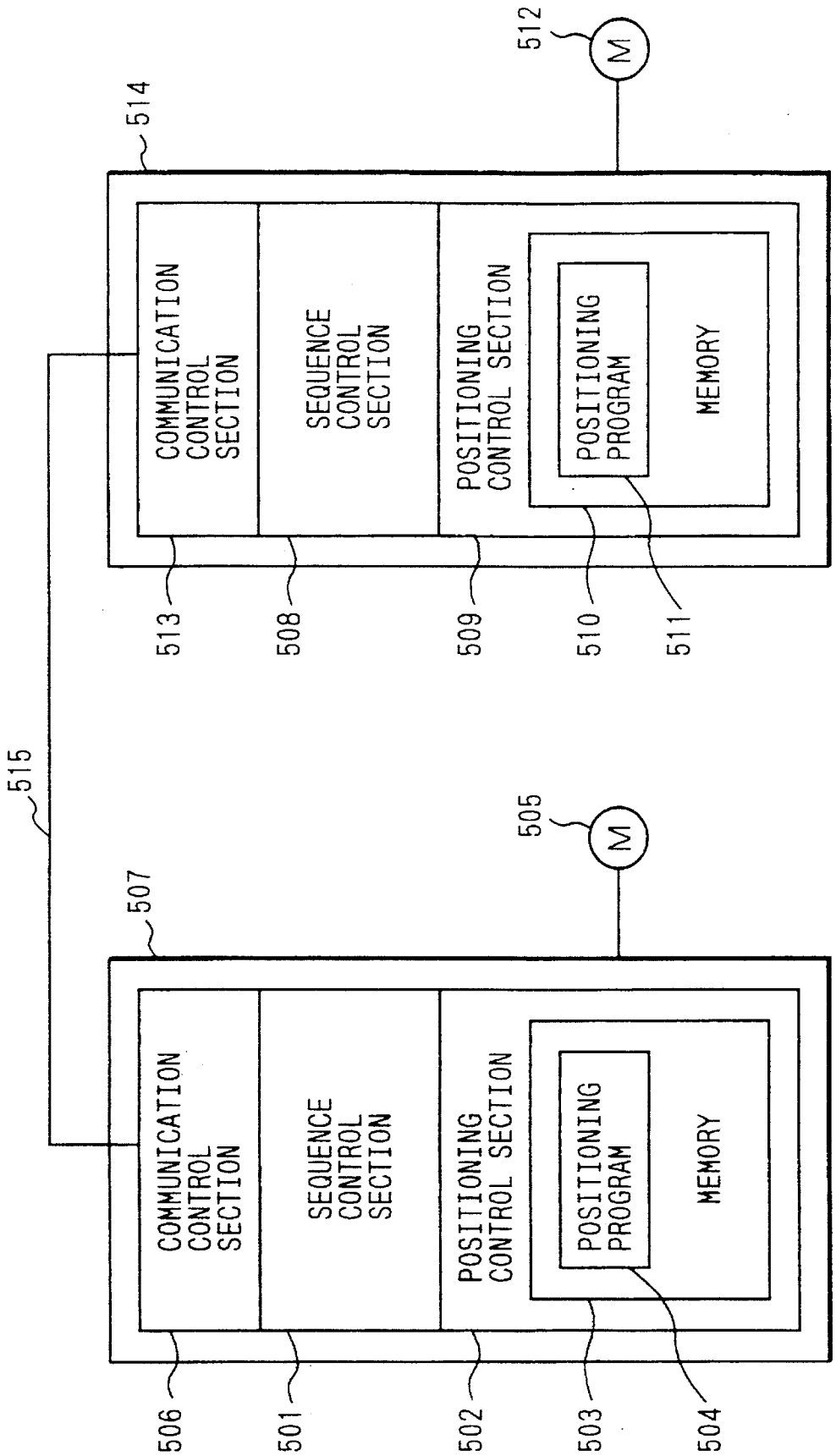
FIG. 8 is a block configuration diagram of a conventional positioning system.

FIG. 1 is a block diagram of a control system showing an embodiment of the present invention. In this drawing, the numerals 505, 512 and 515 indicate parts identical to those shown in FIG. 8.

Control apparatus 107 includes a communication control section 106 which receives a signal transmitted through the transmission path 515 and converts the received signal into a signal to be used by the sequence control section 101. The sequence control section 101 has an internal memory (not shown) having a sequence program stored therein, and a memory 101a (described later). Under control of this sequence program, the sequence control section 101 periodically monitors the received signal and performs predetermined processing in response to the received signal to carry out operations such as, for example, outputting a predetermined output signal.

A positioning control section 102 is activated by a command from the sequence control section 101. Memory 103 is provided in the positioning control section 102 which stores a positioning program 104. A first motor 505, such as, for example, a servo motor, can be attached to an axis of an apparatus such as, for example, a solenoid valve. The first motor 505 can be driven by the positioning control section 102 as controlled by the positioning program 104. That is, the positioning control section 102 drives the servo motor 505 to perform predetermined positioning control and, for example, adjust the axis of the apparatus to align the apparatus at a predetermined position. The communication control section 106 also receives control information output by the sequence control section 101, converts that information into a signal transmittable by the transmission path 515, and transmits the signal to the transmission path 515.

Control apparatus 114 comprises a communication control section 113, which is coupled to the communication control section 106 by transmission path 515. In a manner similar to the communication control section 106, the communication control section 113 converts a signal transmitted through the transmission path 515 into control information signals, and inputs those signals to the sequence control section 108. The sequence control section also has a memory (not shown) for storing a sequence program. Also, the communication control section 113 converts control information output from the sequence control section 108 into a signal transmittable by the transmission path 515, and transmits that signal to the transmission path 515.

Similar to the operation in the control apparatus 107, a positioning control section 109 is activated by a command from the sequence control section 108. Memory 109a (described later) is provided in the positioning control section 109. A second motor 512, for example, a servo motor, can be driven by the positioning control section 109 as controlled by information which is stored in memory 109a as described below. That is, the positioning control section 109 drives the servo motor 512 to carry out predetermined positioning control which, for example, controls solenoid valves, relays, etc. (not shown) in a predetermined sequence.

The positioning control of the servo motors 505 and 512 is exercised by the execution of the positioning program 104 having instruction steps including data codes for indicating the servo motors, and indicating a moving method, addresses and speeds of each respective servo motor. When the code indicating the servo motor indicates servo motor 505, the positioning control section 102 drives the servo motor 505.

Alternatively, when the code indicating the servo motor indicates servo motor 512, the positioning control section 102 transmits the control information consisting of the address, speed and synchronization signal to the sequence control section 101. The sequence control section 101 then stores data representing the address and speed information in memory 101a.

The control information comprising the address and speed data stored in memory 101a, and an appropriate synchronization signal is provided from the sequence control section 101 to the communication control section 106, which then provides that control information via the transmission path 515 to the communication control section 113. The communication control section 113 receives the control information and provides it to the sequence control section 108. The sequence control section 108 then provides the control information to the memory 109a of the positioning control section 109, which stores this information. The position control section 109 thus drives the servo motor 512 in accordance with that control information stored in the memory 109a to exercise positioning control.

On completion of the positioning control, control information indicating the completion of positioning is transferred from the positioning control section 109 to the sequence control section 108, which further transfers this information to the communication control section 113. The communication control section 113 transfers this information to the communication control section 106 via transmission path 515. The communication control section 106 transfers this information to the sequence control section 101, which further transfers this control information to the positioning control section 102. In accordance with this control information, the positioning program 104 proceeds from the instruction step in execution to a next instruction step.

Figure 2:
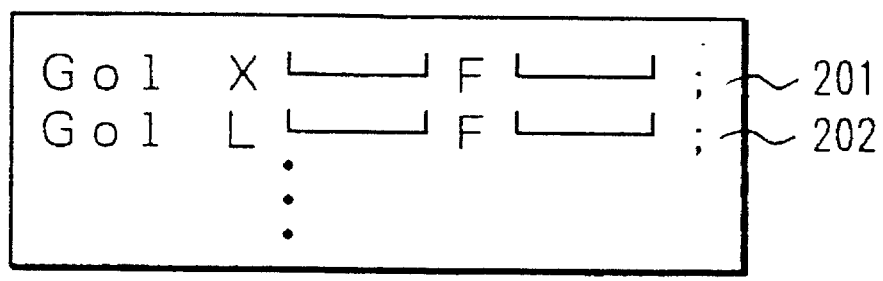
FIG. 2 illustrates a program list of an example of a positioning program according to the preferred embodiment of the present invention.

FIG. 2 shows part of the program list of an example of the positioning program 104 which is stored in the memory 103. The exemplary positioning program 104 includes, for example, an instruction step 201 for driving the servo motor 505 to carry out positioning control and an instruction step 202 for driving the servo motor 512 to exercise positioning control.

In FIG. 2, instruction step 201 is written as follows:

G01X ⌴ F ⌴ and instruction step 202 is written as follows:

G01L ⌴ F ⌴

Figure 10:
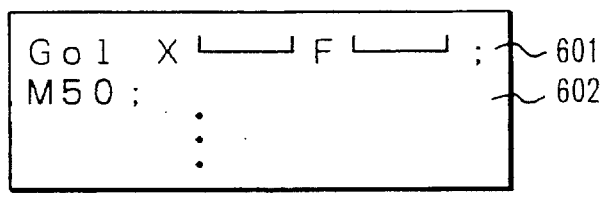
FIG. 10 illustrates a program list of a conventional positioning program.
Figure 11:
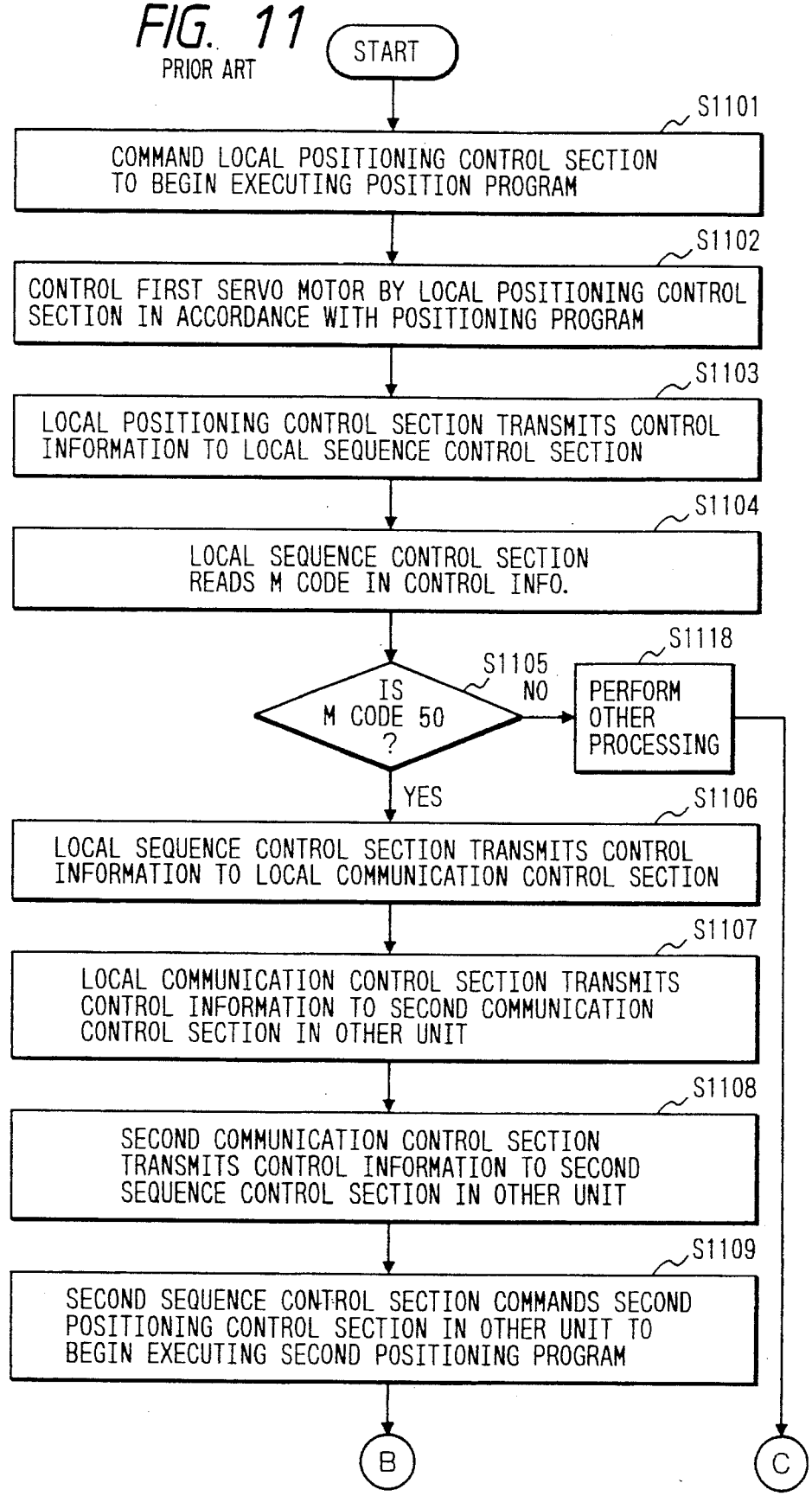
FIG. 11 is a flowchart showing operations of the conventional positioning system.
Figure 12:
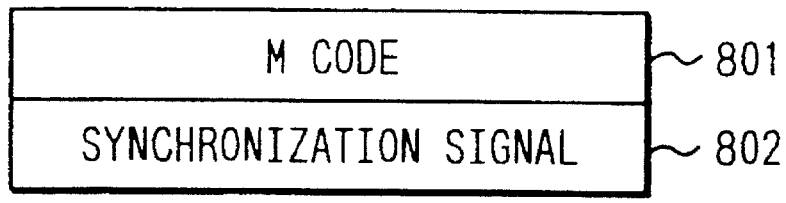
FIG. 12 illustrates control information in the conventional positioning system.
Figure 13:
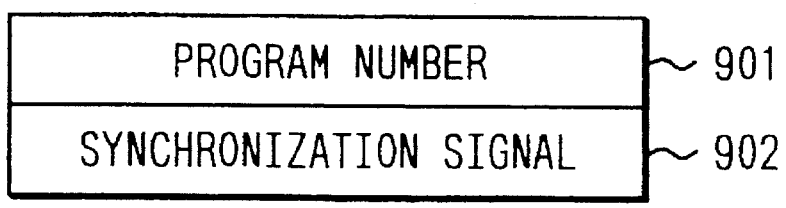
FIG. 13 illustrates control information in the conventional positioning system.
Figure 14:
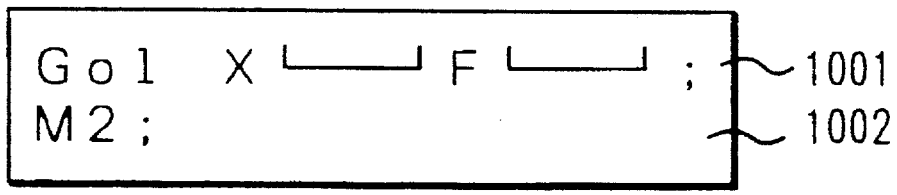
FIG. 14 illustrates a program list of the conventional positioning program.
Figure 15:
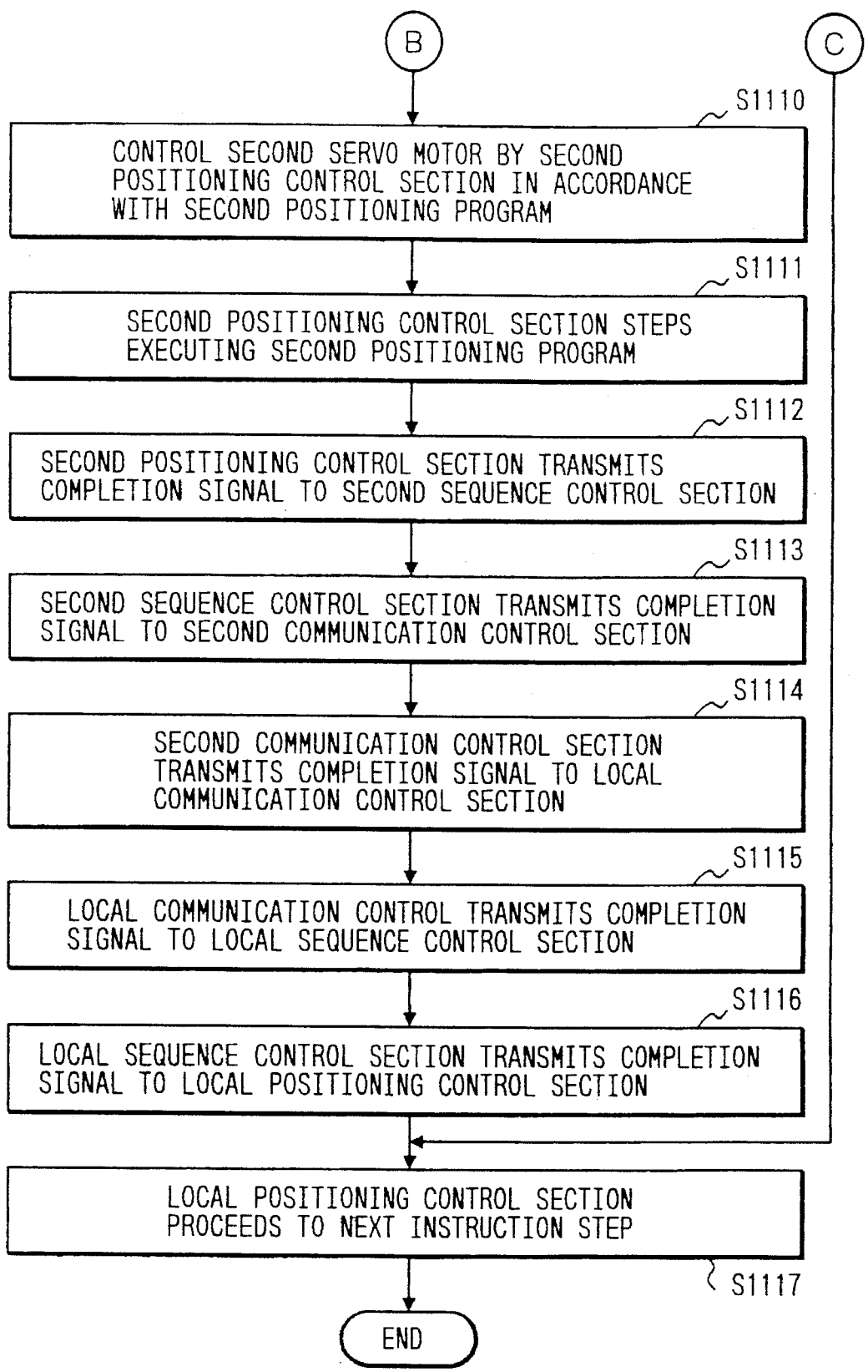
FIG. 15 is a flowchart showing further operations of the conventional positioning system.

The instruction step 201 is identical to the conventional instruction step 601, as shown in FIG. 10. Also, although the code indicating the servo motor in the fourth digit of the instruction step 202 is not X but L, the other parts of this code are identical to those of the conventional instruction step 1001 as shown in FIG. 14. L in the fourth digit represents the servo motor 512.

The instruction step 201 carries out linear interpolation and drives the servo motor 505 to move and position the corresponding axis to the address indicated by a value represented by data present in a space subsequent to X at the speed indicated by a value represented by data present in a space subsequent to F. Similarly, the instruction step 202 carries out linear interpolation and represents that the servo motor 512 is driven to move and position the corresponding axis to the address indicated by a value represented by data present in a space subsequent to L at the speed indicated by a value represented by data present in a space subsequent to F.

A sequence of control will now be described with reference to FIGS. 2–6, and FIG. 9, which was used to describe the conventional art.

In step S301, when the sequence control section 101 is required, for example, to drive the servo motor 505 to exercise positioning control, the sequence control section 101 commands the positioning control section 102 to start the positioning program 104. When the positioning control section 102 has started the positioning program 104 to execute the instruction step 201 shown in FIG. 2, as shown in step S302, positioning control section 102 exercises feedback control to drive the servo motor 505 to position the corresponding axis to the specified address at the specified speed to perform linear interpolation.

Figure 4:
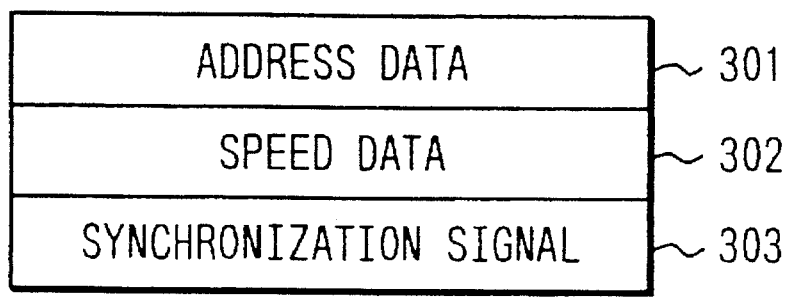
FIG. 4 illustrates control information according to the preferred embodiment of the present invention.
Figure 3:
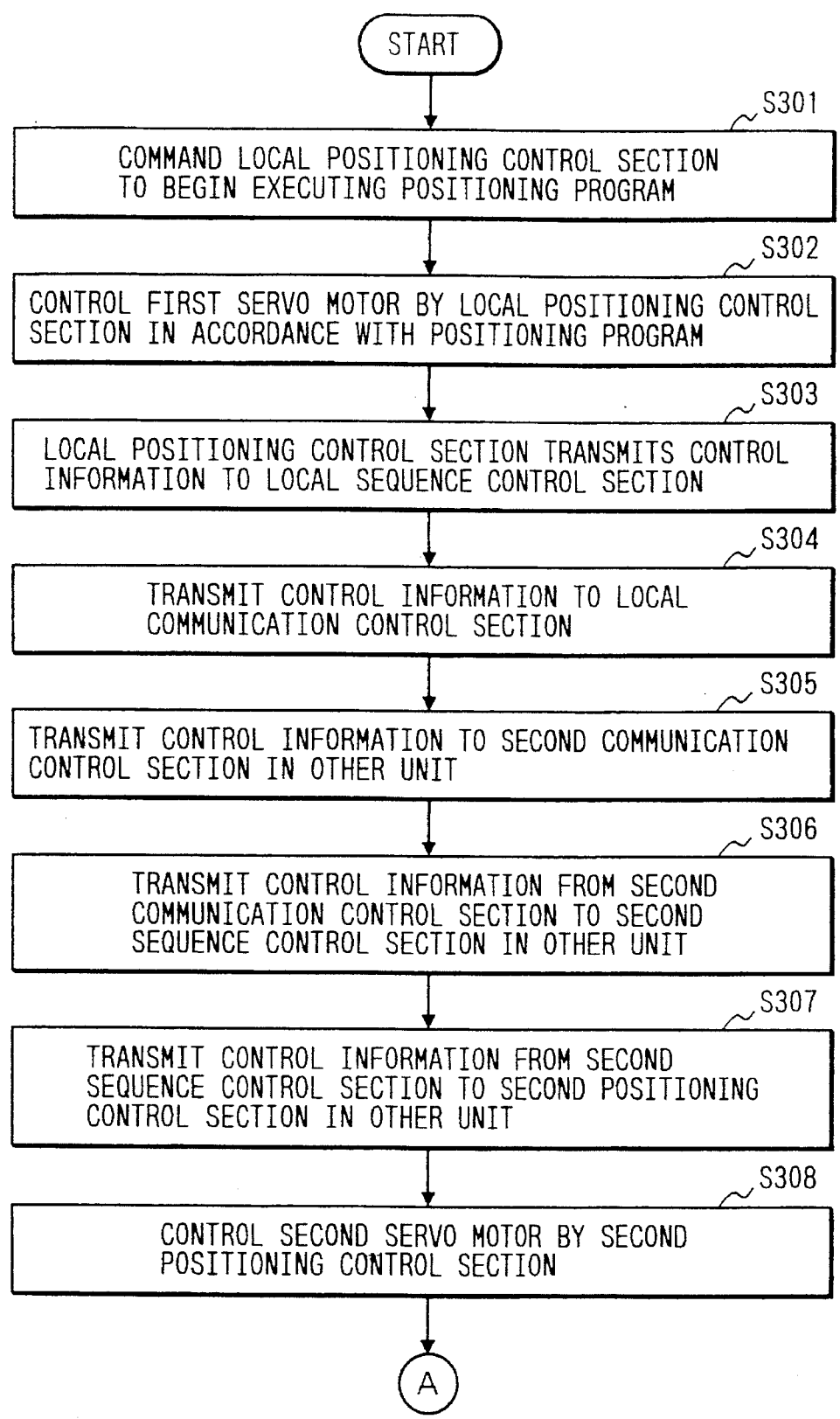
FIG. 3 is a flowchart showing operations of an embodiment of the positioning system of the present invention.
Figure 9:
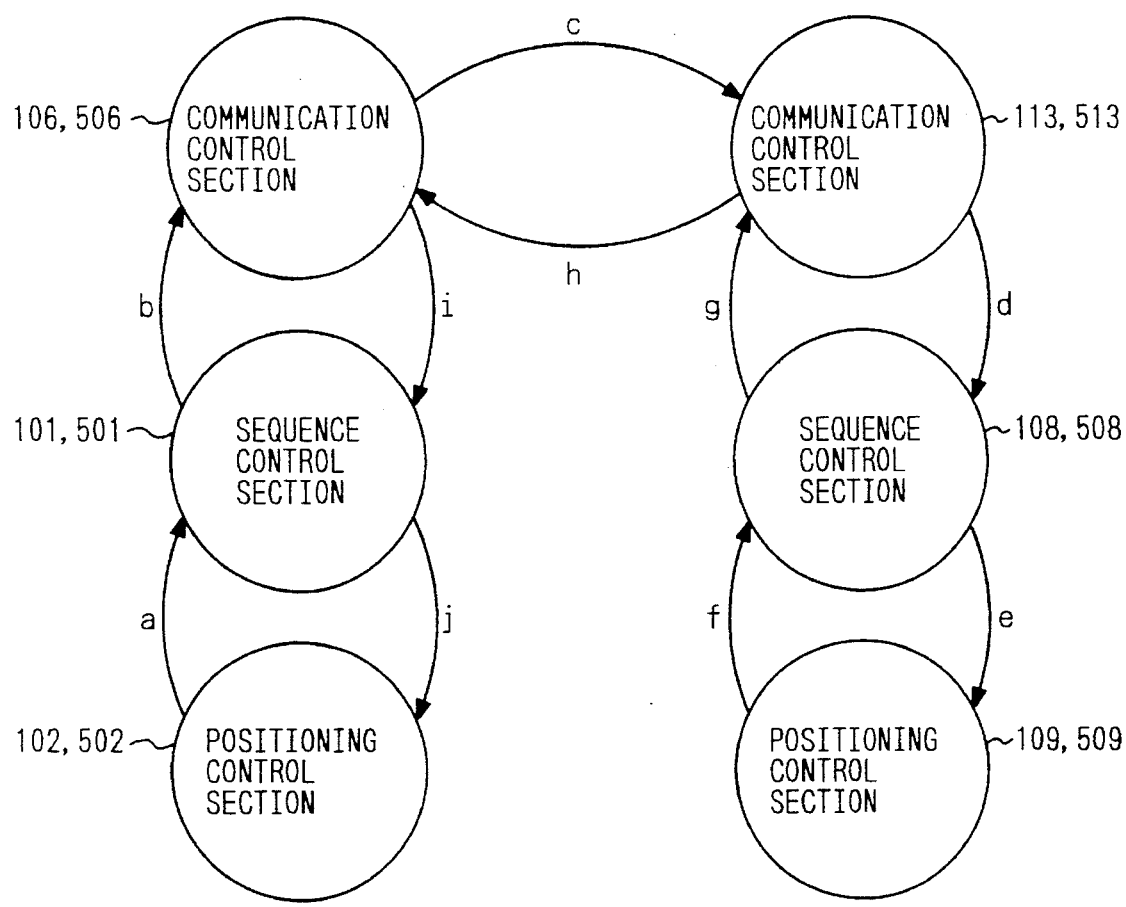
FIG. 9 illustrates the transfer paths of the control information.

In step S303, positioning control section 102 executes instruction step 202, and outputs the control information shown in FIG. 4 (the address 301, the speed 302 and the synchronization signal 303) to the sequence control section 101 as indicated by control information transfer path "a" in FIG. 9. The synchronization signal is a signal which is output by the positioning control section 102 to the sequence control section 101 to inform the sequence control section 101 of the timing at which the address and speed output by the positioning control section 102 can be read.

The sequence control section 101 stores the address and speed data from among the control information output by the positioning control section 102 into the memory 101a and, in step S304, transmits the address and speed together with the synchronization signal to the communication control section 106 as indicated by control information transfer path "b". The communication control section 106 converts the control information output by the sequence control section 101 into a signal transmittable on the transmission path 515 and, in step S305, transmits the signal to the communication control section 113 via the transmission path 515 as indicated by control information transfer path "c". The communication control section 113 receives the signal transmitted by the communication control section 106, converts this signal into control information consisting of the address, speed and synchronization signal, and, in step S306, outputs the converted information to the sequence control section 108 as indicated by control information transfer path "d".

In accordance with the control information output from the communication control section 113, in step S306, the sequence control section 108 transmits the control information consisting of the address, speed and synchronization signal to the positioning control section 109 as indicated by control information transfer path "e". The memory 109a of the positioning control section 109 stores the address and speed data in this control information. In step S307, the positioning control section 109 exercises feedback control and drives the servo motor 512, in accordance with the address and speed data in the control information transmitted from the sequence control section 108 and stored in memory 109a, to position the axis, thereby carrying out linear interpolation.

Figures 6, 7:
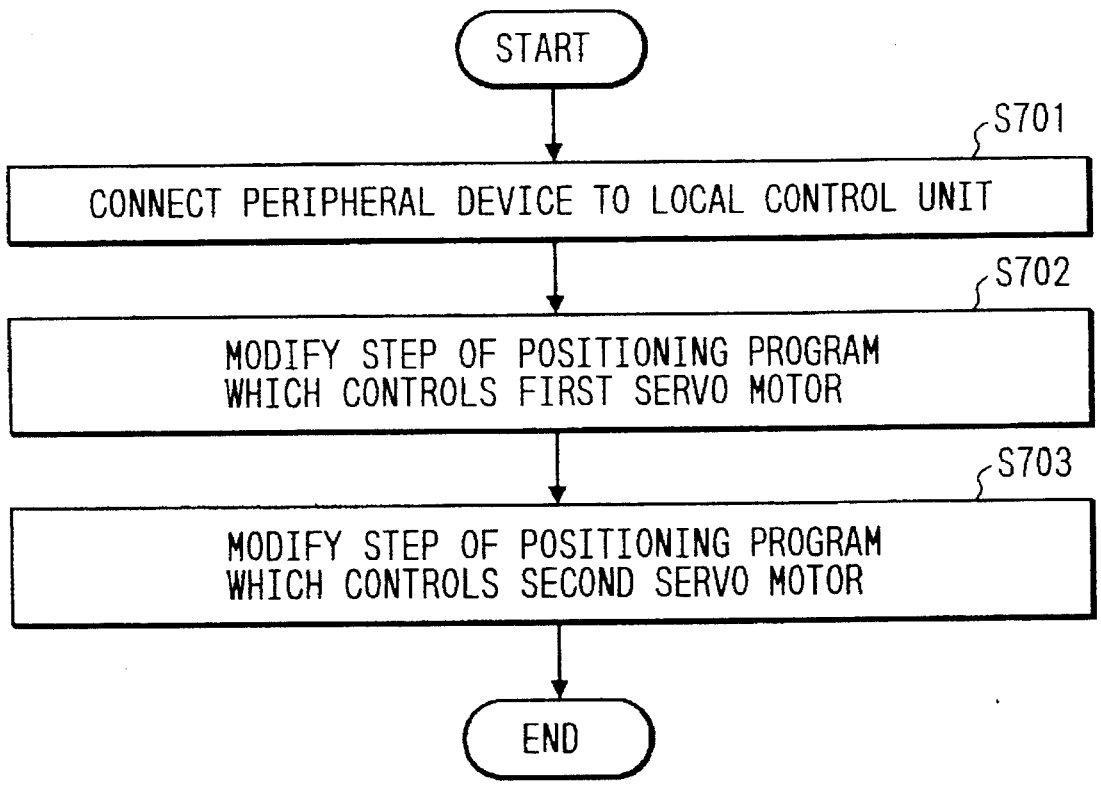
FIG. 6 illustrates control information according to the preferred embodiment of the present invention.
FIG. 7 illustrates the steps for using a peripheral device to change the positioning programs in the control apparatus of the present invention.

When this positioning operation is then complete, as shown in step S309 of FIG. 5, a completion signal 401, such as that shown in FIG. 6, is transmitted from the positioning control section 109 to the sequence control section 108 as indicated by control information transfer path "f". When the completion signal 401 is sent by the positioning control section 109 to the sequence control section 108, in step S31, the sequence control section 108 further transmits the completion signal 401 to the communication control section 113 as indicated by control information data transfer path "g". After the completion signal 401 is sent to the communication control section 113 by the sequence control section 108, in step S311, the communication control section 113 converts the completion signal, if necessary, to transmittable format and further transmits the completion signal 401 to the communication control section 106 in the control apparatus 107 via the transmission path 515 as indicated by control information transfer path "h".

When the completion signal 401 is sent to the communication control section 106 by the communication control section 113, in step S312, the communication control section 106 converts the completion signal, if necessary, to a format usable by the sequence control section 101 and further sends the completion signal 401 to the sequence control section 101 as indicated by control information transfer path "i". When the completion signal 401 is transmitted to the sequence control section 101 by the communication control section 106, in step S313, the sequence control section 101 further transmits the completion signal 401 to the positioning control section 102 as indicated by control information transfer path "j".

When the completion signal 401 is sent to the positioning control section 102 by the sequence control section 101, the positioning control section 102 ends the execution of the instruction step 202 and advances to a subsequent instruction step as shown in step S314.

As described above, the servo motor 512 is driven under the command of the positioning control section 102 in the control apparatus 107 to exercise positioning control.

In a second embodiment of the invention, the control apparatus may be connected to control a plurality of servo motors. While only the address and speed are transmitted together with the synchronization signal from the control apparatus 107 to the control apparatus 114 in the first embodiment, a code (not shown) indicating a particular servo motor may also be transmitted to selectively control a plurality of servo motors controlled by the control apparatus 114 under the control of the control program stored in the control apparatus 107.

In a third embodiment, in addition to transmitting the codes in the first and second embodiments, a code indicating the moving method may further be transmitted from the control apparatus 107 to the control apparatus 114. In this arrangement, it is possible to instruct the control apparatus 114 to move the axis in another moving method, without the moving method being limited to linear interpolation.

In a fourth embodiment of the invention, the speed of the servo motor may be specified separately, and thus not transmitted from the control apparatus 107 to the control apparatus 114 as in the first three embodiments. Alternatively, if the control apparatus 114 needs no address specified by the control apparatus 107, the control apparatus 107 may transmit the speed without the address.

It will be apparent from the above detailed description that the invention enables the operation of both servo motors to be modified by connecting a peripheral device only to the control apparatus 107. That is, as shown in step S701 in the flowchart of FIG. 7, a peripheral device for correcting positioning program 104 is connected to control apparatus 107. In step S702, instruction step 201 of the positioning program 104 is modified to modify the operation of servo motor 505. In step S703, instruction step 202 of the positioning program 104 is modified to modify the operation of servo motor 512. Thus, the peripheral device need not be removed from control apparatus 107 and connected to control apparatus 114 to modify movement of the servo motor 512. Accordingly, the program modification is performed much easier than in the conventional apparatus.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A control system comprising:

a first control apparatus for controlling a first object and a second control apparatus for controlling a second object, said first control apparatus storing and executing a positioning program containing instructions for instructing said second control apparatus to control the second object, wherein the instructions contain control data and wherein said control data is transferred to said second controller during execution of said positioning program in said first control apparatus, and wherein said control data includes data for identifying a positioning target address to which said second object is controlled to be moved, and speed data representing the speed at which said second object is to be moved to said positioning target address.

2. A control system as claimed in claim 1, wherein said first control apparatus comprises:

a memory for storing the positioning program;

a second memory for storing said control data; and a communication control section for transmitting said stored control data to said second control apparatus.

3. A control system as claimed in claim 2, wherein said second control apparatus further comprises:

a memory for storing said control data when said control data is transmitted from said first control apparatus to said second control apparatus;

said second control apparatus controlling said second object in accordance with said control data.

4. A control system as claimed in claim 3, wherein said second control apparatus provides a completion signal to said first control apparatus when controlling of said second object is completed.

5. A control system as claimed in claim 1, wherein:

said first control apparatus comprises: a sequence control section having a memory for storing said control data; and a communication control section for transmitting said control data to said second control apparatus;

said second control apparatus comprises a memory for storing said control data when said control data is transmitted from said first control apparatus to said second control apparatus, said second control apparatus controlling said second object in accordance with said stored control data; and said control data includes data for identifying a positioning target address to which said second object is controlled to move, and speed data representing the speed at which said second object is controlled to move to said positioning target address.

6. A control method comprising the steps of:

executing, in a first control apparatus, an instruction of a control program stored in a memory of said first control apparatus, said instruction containing control data;

transmitting said control data from said first control apparatus to a second control apparatus during execution of said control program; and causing said second control apparatus to control an object in accordance with the control data of the instruction of said control program, wherein said control data includes data for identifying a positioning target address to which said object is controlled to be moved, and speed data representing the speed at which said object is to be moved to said positioning target address.

7. A control method as claimed in claim 6, further comprising the step of:

causing said first control apparatus to extract said control data from said instruction of said control program and store said extracted control data.

8. A control method as claimed in claim 6, further comprising the step of:

storing said control data in a memory in said second control apparatus.

9. A control method as claimed in claim 6, further comprising the step of:

providing a completion signal, indicating completion of controlling said object, from said second control apparatus to said first control apparatus to cause said first control apparatus to execute another instruction of said control program.

10. A control system comprising:

a first control apparatus including: a memory for driving a first motor in accordance with instructions of a control program stored in said memory, said instructions containing control data and being executed by said first control apparatus; and a communication control section for transmitting the control data of certain of said instructions during execution of said control program in said first control apparatus;

a second control apparatus for driving a second motor; and a transmission path for conveying the control data from said first control apparatus to said second control apparatus, wherein said second control apparatus drives said second motor in accordance with the control data.

11. A control method comprising the steps of:

executing, in a first control apparatus, a first instruction of a control program stored in a memory of said first control apparatus to cause said first control apparatus to drive a first motor;

causing said first control apparatus to execute a second instruction of said control program, said second instruction containing control data;

transmitting said control data from said first control apparatus to a second control apparatus during execution of said control program in said first control apparatus; and causing a second control apparatus to drive a second motor in accordance with the control data of the second instruction of said control program.

* * * * *